(12) United States Patent
Jönsson et al.

(10) Patent No.: US 8,354,639 B2
(45) Date of Patent: Jan. 15, 2013

(54) IR CAMERA WITH ADJUSTABLE VIEW PARAMETER SETTINGS

(75) Inventors: Henrik Jönsson, Stockholm (SE);
Erland George-Svahn, Solna (SE)

(73) Assignee: FLIR Systems AB, Taby (SE)

( * ) Notice: Subject to any disclaimer, the term of this patent is extended or adjusted under 35 U.S.C. 154(b) by 1086 days.

(21) Appl. No.: 12/323,222

(22) Filed: Nov. 25, 2008

(65) Prior Publication Data

US 2010/0127171 A1    May 27, 2010

(51) Int. Cl.
*G02F 1/01* (2006.01)
(52) U.S. Cl. ........................................................ 250/330
(58) Field of Classification Search ................... 250/330
See application file for complete search history.

(56) References Cited

U.S. PATENT DOCUMENTS

| 7,321,119 | B2 * | 1/2008 | King ............................. 250/330 |
| 7,535,002 | B2 * | 5/2009 | Johnson et al. ................ 250/332 |
| 7,544,944 | B2 * | 6/2009 | Strandemar et al. ...... 250/339.05 |
| 2010/0265332 | A1 * | 10/2010 | George-Svahn et al. ..... 348/164 |

\* cited by examiner

*Primary Examiner* — Christine Sung
(74) *Attorney, Agent, or Firm* — Haynes and Boone, LLP (57) ABSTRACT

The invention relates to an IR camera for capturing thermal images of an imaged view, the IR camera comprising an IR camera display arranged to display the captured thermal images to a user of the IR camera according to a view parameter setting. The IR camera is characterized in that it further comprises a display control unit arranged to automatically adjust the view parameter setting in the IR camera display based on a temperature reference area in the captured thermal images, wherein the temperature reference area is obtained using an indication means when a manual indication is performed by the user of the IR camera. The invention further relates to a method for adjusting view parameter settings in an IR camera and a computer program product.

31 Claims, 7 Drawing Sheets

IR CAMERA WITH ADJUSTABLE VIEW PARAMETER SETTINGS

FIELD OF THE INVENTION

The invention relates in general to an IR camera, and in particular to an IR camera comprising an IR camera display with adjustable view parameter settings. The invention also relates to a method for adjusting view parameter settings in an IR camera and a computer programme product for the same.

BACKGROUND OF THE INVENTION

Infrared (IR) thermal cameras can be used in a number of different situations, for example, when inspecting or surveying complex electrical systems such as transformers, switchgears, etc., or water carrying systems such as heat exchangers, radiators, etc. IR cameras are used for capturing, displaying and storing thermal images. The thermal images may then be viewed and analyzed in order to, for example, find faulty electrical wirings or couplings, leaking water pipes, etc.

When viewing a thermal image captured by an IR camera in an IR camera display, there are a number of different view parameters that determines how the thermal image is presented to the user of the IR camera. For example, there may be a thermal image colour span, which the user may set in order to determine in between which temperature values the colour map of the presented thermal image should range. A further example is a thermal image colour level, which the user may set in order to determine around which temperature the colours should be centred.

Different settings of these view parameters in an IR camera may be used in situations, such as, for example, when trying to perform scene comparisons that have the same colour-to-temperature scaling, or in order to identify and show temperature gradients in thermal images with large temperature differences where the interesting temperature gradients is within a small portion of the entire thermal image.

These view parameters require default settings or that manual settings are inputted into the IR camera in order to present a thermal image that can be readily interpreted by the user. However, this requires that the user of the IR camera be experienced and understands exactly how to adjust the view parameters in order to get the information he needs. For an inexperienced user, the manual inputs may be difficult to understand and inefficient to use.

Furthermore, it may also be difficult for an inexperienced user to know how to adjust the settings of the view parameters in order to see other objects, particularly, if the IR camera is in a fusion mode where the temperatures that are bottomed (flattened) are replaced with a visual image, that is, the pixels having a temperature that are outside the thermal image colours span being replaced with visual image pixels. It may also be difficult to adjust the view parameter settings and interpret what you actually see when, for example, sweeping with the IR camera over an area with different temperature content looking for small temperature gradients at different temperature levels.

Automatic settings based on the entire thermal image content or a majority of the entire thermal image content is known. These automatic settings may work well in some situations, but work less well in others, such as, for example, when viewing an image view with large temperature differences or when the user is only interested in a specific portion of the thermal image.

SUMMARY OF THE INVENTION

A problem to which the invention relates is how to provide an easy and simple adjustment of view parameter settings of an IR camera display in an IR camera.

This problem is addressed by an IR camera for capturing thermal images of an imaged view, the IR camera comprising an IR camera display arranged to display the captured thermal images to a user of the IR camera according to a view parameter setting. The IR camera is characterized in that it further comprises a display control unit arranged to automatically adjust the view parameter setting in the IR camera display based on a temperature reference area in the captured thermal images, wherein the temperature reference area is obtained using an indication means when a manual indication is performed by the user of the IR camera.

The problem is also addressed by a method for adjusting view parameter settings in an IR-camera, the IR camera comprising an IR camera display arranged to display the captured thermal images to a user of the IR camera according to the view parameter settings. The method is characterized by the steps of: receiving a manual indication from the user of the IR camera to obtain a temperature reference area in the captured thermal images; obtaining the temperature reference area using an indicating means; and automatically adjusting the view parameter settings in the IR camera display based on the temperature reference area.

The problem is further addressed by a computer program product for adjusting view parameter settings of an IR-camera display for viewing images captured by a IR camera, which comprises computer readable code means, which when run in a display control unit in the IR camera causes the display control unit to perform the steps of: receiving a manual indication from a user of the IR camera to obtain a temperature reference area in the captured thermal images using an indicating means; obtaining the temperature reference area using an indicating means; and automatically adjusting the view parameter settings in the IR camera display based on the temperature reference area.

This allows for both experienced and inexperienced users of an IR camera to easily obtain the information they need by simply indicating on the IR camera to automatically adjust the view parameter settings according to a temperature reference area in the captured thermal image, which is visible on the IR camera display. The user may direct the IR camera such that the temperature reference area is located on a desired spot in an imaged view, and automatically obtain suitable view parameter settings based on said desired spot. Also, by providing this easy and simple automatic adjustment of the view parameter settings, the amount of errors and wrongful interpretations of the thermal images captured by the IR camera may be reduced.

An advantage of the above described invention is that it does not require any manual settings of the view parameters to be entered.

Another advantage of the above described invention is that it enables the view parameters to be automatically set based upon very small objects and/or areas in the imaged view, since the temperature reference area may comprise any number of pixels down to a single image pixel.

A further advantage of the above described invention is that it enables a user to easily adjust the view parameter settings when sweeping with the IR camera over an area with different temperature content looking for small temperature gradients at different temperature levels. This improves the efficiency of the IR camera, since the user does not have to manually re-enter new view parameter settings for each of the small temperature gradients at different temperature levels.

A further advantage of the above described invention is that it enables a user to perform scene comparisons that have the same colour-to-temperature scaling, by keeping the IR parameter settings in between the different scenes as compared to when using, for example, automatic settings based on the entire image content.

Preferably, the IR camera comprises a light source means emitting at least one narrow beam within the visible wavelength region towards a specific spot on the imaged view, and is arranged to interpret the specific spot as the at least one temperature reference area in the captured thermal image. Thus, the IR camera provides a clear correlation for the user between the imaged view and the real physical objects/areas captured by said imaged view. Since the user can actually see, without looking in the IR camera display, onto which object/area the temperature reference area is directed, it also helps the user to better understand which object/area that the view parameter settings are based upon.

Preferably, the IR camera also comprises an IR imaging part for capturing IR image data of said imaged view, and a visual imaging part for capturing visible light data of said imaged view, wherein the view parameter settings further comprises an IR/Visual fusion threshold. This feature enables the user of the IR camera to quickly retrieve, by aiming the temperature reference area towards an area with a suitable temperature level, a suitable level for the IR/Visual fusion threshold in the imaged view.

Preferably, the IR camera further comprise object segmentation means arranged to segment an imaged view such that the resulting segments can be associated with objects in said imaged view. The IR camera may further be arranged to identify a segment in the segmented imaged view, which is associated with an object, by using said at least one temperature reference area in said captured thermal image, and compile the image shown by the IR camera display such that the part of the image associated with the identified segment will be retrieved from the IR image data, and the remaining parts of the image will be retrieved from the visual image data. This feature enables the user of the IR camera to aim the IR camera towards an object and display the object as IR, while the rest of the image is displayed as a visual image. This may also be performed vice versa such that the object is displayed as a visual image, while the rest of the image is shown as IR. Replacing an object having a homogenous appearance in the visual image with IR image data will not remove any essential information from the visual image. The compiled image may therefore be as easily interpreted as the visual image. It may also lead to a more natural interpretation of what the user interprets as a coherent object in the thermal image.

Further advantageous embodiments of the IR camera, the method and the computer program product are set forth in the dependent claims, which correspondently describe further advantageous embodiments of the invention.

BRIEF DESCRIPTION OF THE DRAWINGS

The invention will be described in more detail in the following with reference to the appended drawings, in which.

DETAILED DESCRIPTION

Figure 1:
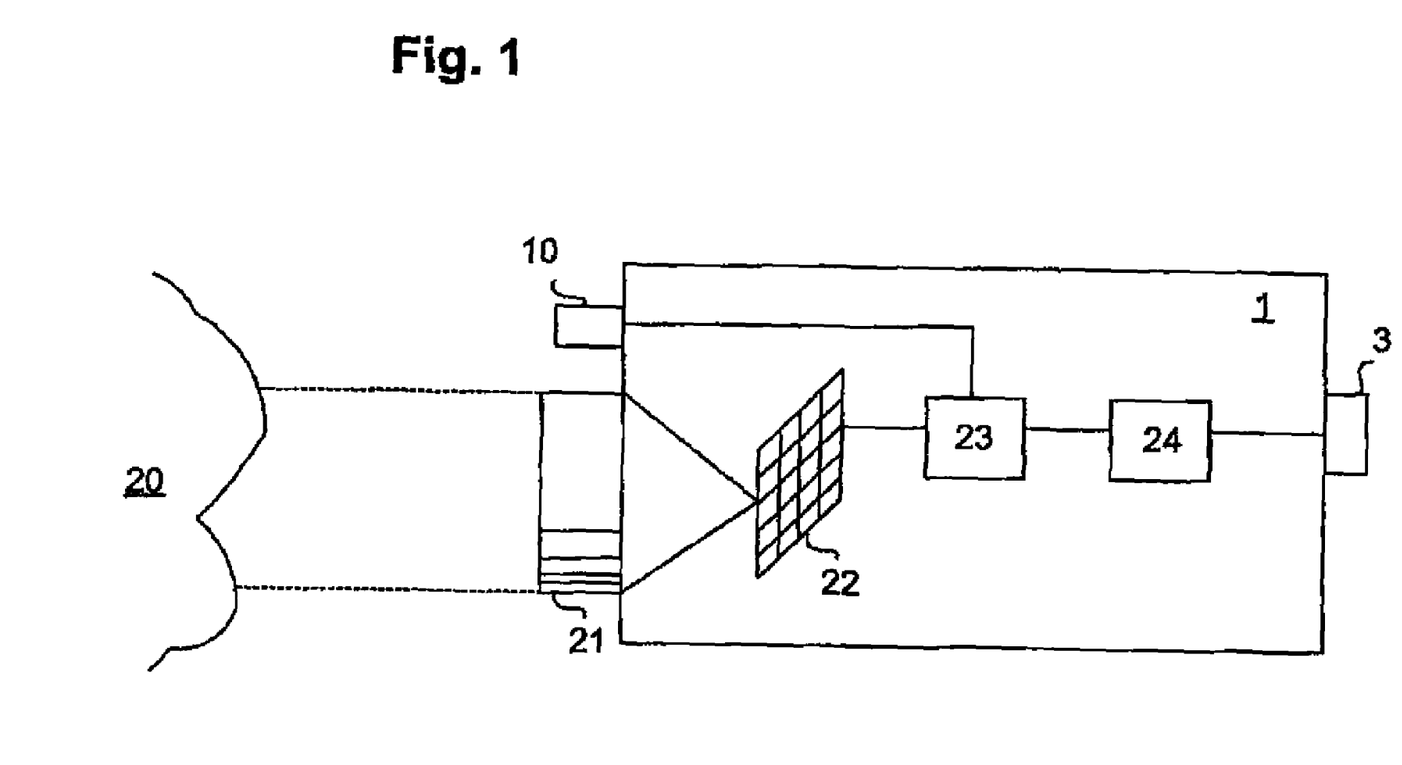
FIG. 1 shows an IR camera according to the invention.

FIG. 1 shows an IR camera 1 according to an embodiment of the invention arranged to automatically adjust the view parameter settings of an IR camera display 3. The IR camera 1 may comprise at least one lens arrangement 21, a detector array 22, a signal conditioning and processing unit 23 and a display control unit 24. The IR camera 1 may also comprise a pointing light source 10.

The incoming radiation to the IR camera 1 is focused by at least one lens arrangement 21 onto the detector array 22. The detector array 22 may typically be a matrix of detector elements, each of which may detect radiation from a corresponding area on an object 20, for example, a wall, water pipes, electrical connectors, etc., that is being imaged. The detector array 22 may, for example, be a focal plane array (FPA).

From the detector array 22, the thermal image signal comprising temperature measurement data may be fed to a signal conditioning and processing unit 23. The signal conditioning and processing unit 23 may perform conventional signal conditioning, such as, for example, corrections for the inherent offset, gain drift, etc.

The signal conditioning and processing unit 23 may also be connected to a pointing light source 10. The pointing light source 10 may be arranged to indicate a point on an object 20 in order to, for example, make it easy for the person manoeuvring the IR camera 1 to know where the IR camera 1 is directed. The pointing light source 10 may have a narrow visible beam, preferably a laser, emitting light within the visible wavelength region. The light may also preferably be separable from the wavelength region recorded by the IR camera 1. This means that the light on the object 20 caused by the pointing light source 10 will not be seen in the thermal images captured by the detector array 22 of the object 20. From the information received in the thermal image signal and from the pointing light source 10, the signal conditioning and processing unit 23 may be arrange to determine the position in the thermal image of the point on the object 20 onto which the pointing light source 10 is directed. This positional information and the thermal image signal may then be sent from the signal conditioning and processing unit 23 to a display control unit 24.

The display control unit 24 is arranged to receive the thermal image signal from the signal conditioning unit 23. It may also be arranged to receive the positional information from the signal conditioning unit 23 and inputs from an inputting means 11 (shown in FIG. 2). The display control unit 24 is arranged to control an IR camera display 3, for example, a viewfinder and/or a digital display provided on the IR camera housing. The display control unit 24 may be arranged to perform the necessary adjustments to the thermal image signals and to the view parameter settings of the IR camera display 3 before being shown in the IR camera display 3. The adjusted thermal images recorded by the IR camera 1 can then be seen in the IR camera display 3, and thus be presented to a user of the IR camera 1. The thermal images may be thermal image video and/or still thermal images.

Furthermore, based on the positional information received from the signal conditioning and processing unit 23, the display control unit 24 may preferably create and move a marker 9 (shown in FIGS. 2 and 4) or markers on the display of the viewfinder and/or IR camera display 3 to such a position that the marker 9 marks the point to where the pointing light source 10 is currently directed. The operation of the display control unit 24 in the IR camera 1 according to the invention is described in more detail in the exemplary embodiments presented below with reference to FIGS. 2-8.

Furthermore, the IR camera 1 may also comprise visible light optics (not shown) in order to also capture visible light data of the IR imaged view 2. This visual imaging part may be used by the display control unit 24 to merge visual image data with the IR image data from the IR imaging part in order to create a fusion image comprising both IR and visible light data. The display control unit 24 may then present the fusion image in the IR camera display 3. The visual imaging part may also be used by the signal condition and processing unit 23 when determining the position in the thermal image of the point on the object 20 onto which the pointing light source 10 is directed. Exemplary operations of this are described in more detail in the embodiment below with reference to FIG. 4.

Additionally, the display control unit 24 in the IR camera 1 may also comprise object segmentation means arranged to segment a thermal image of an imaged view 2 such that the resulting segments can be associated with objects in said imaged view 2. Exemplary operations of this are described in more detail in the embodiments below with reference to FIGS. 6 and 8.

It should be noted that the signal conditioning and processing unit 23 and the display control unit 24 may be provided as one physical unit, or alternatively as a plurality of logically interconnected units. The signal conditioning and processing unit 23 and the display control unit 24 may also comprise logic for performing the functionality of the IR camera 1. This functionality may be implemented partly by means of a software or computer program. The signal conditioning and processing unit 23 and the display control unit 24 may also comprise storage means or a memory unit for storing such a computer program and processing means or a processing unit, such as a microprocessor, for executing the computer program. The storage means may also be readable storage medium separated from, but connected to the signal conditioning and processing unit 23 and the display control unit 24. When, in the following, it is described that the IR camera 1, the signal conditioning and processing unit 23 or the display control unit 24 performs a certain function it is to be understood that the signal conditioning and processing unit 23 and/or the display control unit 24 may use the processing means to execute a certain part of the program which is stored in the storage means.

Figure 2:
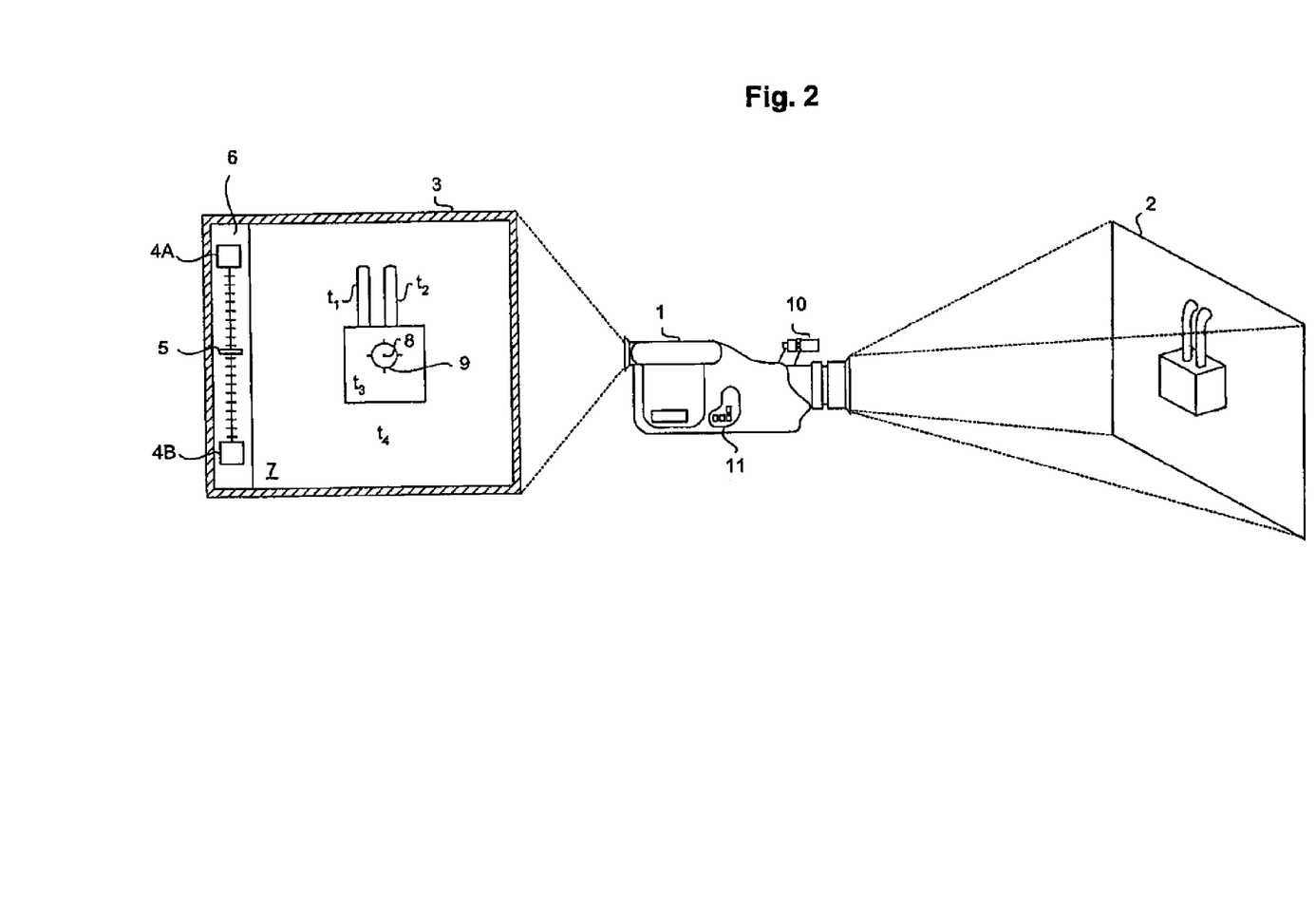
FIG. 2 is an illustration of an exemplary operation of an IR camera according to the invention.

FIG. 2 illustrates an exemplary operation of the IR camera 1 according to the invention. The IR camera 1 may be directed towards an imaged view 2. The imaged view 2 may comprise objects of which the user of the IR camera 1 wants to capture a thermal image 7. The IR camera 1 may capture the thermal image 7 and present said thermal image 7 in the IR camera display 3. However, the user of the IR camera 1 must then adjust the view parameter settings 4A, 4B, 5 of the IR camera display 3. This may be performed in order for the IR camera display 3 to show a thermal image 7 that is adapted to one or several of the temperature levels $t_1$, $t_2$, $t_3$ and/or $t_4$ of the objects in the imaged view 2.

For illustrative purposes, the objects in the image view 2 are shown as comprising only one specific temperature level $t_1$, $t_2$, $t_3$ or $t_4$, respectively. It should however be understood that each of the objects in the image view 2 may have a several temperatures or a temperature range, and that these temperatures may be displayed in the thermal image 7 in the thermal image display 3.

The view parameter settings 4A, 4B, 5 may, for example, be displayed to a user in an area 6 next to the thermal image 7 in the IR camera display 3. The view parameter settings 4A, 4B, 5 of the IR camera display 3 may be a thermal image colour span 4A, 4B and a thermal image colour level 5. Thermal image colour span 4A, 4B may determine the temperature range of the IR camera display 3, that is, between which maximum and minimum temperature the colours of the IR camera display 3 should range or be distributed. The temperatures in the thermal image 7 outside the thermal image colour span 4A, 4B will be bottomed or flattened, i.e. shown as a neutral colour by the IR camera display 3, such as, for example, black. The thermal image colour level 5 may determine around which temperature the colours of the IR camera display 3 should be centred.

The relationship between the thermal image colour span 4A, 4B and the thermal image colour level 5 may be described as follows. By setting a thermal image colour span 4A, 4B, the thermal image colour level 5 will automatically be located at the temperature in the centre of the temperature range defined by the thermal image colour span 4A, 4B. By setting or changing a thermal image colour level 5, the current thermal image colour span 4A, 4B will still comprise the same temperature range, but will now be centred around the new thermal image colour level 5. For the latter, a default setting of the thermal image colour span 4A, 4B may be used if no thermal image colour span 4A, 413 has yet been set.

It is previously known for a user of an IR camera to perform the adjustments of the view parameter settings of the IR camera display manually. However, these manual adjustments require a great deal of skill and knowledge about the function of the IR camera and about how to achieve a thermal image in the IR camera display that by its colour assignment is able to present an image that clearly demonstrates the thermal characteristics of the imaged object in such a way that relevant information about the imaged object may be obtained. This is because of the fact that there may be large temperature variations between the temperature levels $t_1$, $t_2$, $t_3$ and/or $t_4$ of the objects in the imaged view, and it is preferable to, for example, have such a close thermal image colour span as possible. In order to achieve this, the user of the IR camera may slide the thermal image colour level up and down in order to determine suitable ends of the thermal image colour span.

It is also known to have a colour distribution between temperatures in the thermal image colour span that is linear, non-nonlinear, or is assigned according to a colour distribution algorithm which adapts the colour distribution based on the entire thermal image content or a majority of the entire thermal image content.

In this exemplary embodiment, and according to the inventive features of the invention, the IR camera 1 is arranged to automatically adjust the view parameter setting 5 in the IR camera display 3 based on a temperature reference area 8 in the captured thermal image 7. That is, for example, to automatically adjust the thermal image colour level 5 of the thermal image 7 shown in the IR camera display 3 according to the temperature reference area 8 in the imaged view 2 indicated by a centred marker 9 in the IR camera display 3.

The user of the IR camera 1 may direct the centred marker 9 in the IR camera display 3 onto a desired object in the imaged view 2. This may be performed by the user by moving the IR camera 1. The temperature reference area 8 may be obtained when a manual indication is performed by the user of said IR camera 1. The manual indication may be performed by using the inputting means 11, which may, e.g., be buttons or the like accessible on the IR camera housing or on the IR camera display 3 in the form of, e.g., a touch screen. By using the inputting means 11 for the manual indication, the user of the IR camera 1 may indicate to the display control device 24 in the IR camera 1 to automatically set the thermal image colour level 5 according to the temperature level of the object that the temperature reference area 8 is currently directed upon. The object may be indicated by, e.g., the centred marker 9 in the IR camera display 3. The temperature reference area 8 may comprise one, several or any number of thermal image pixels.

Figure 3:
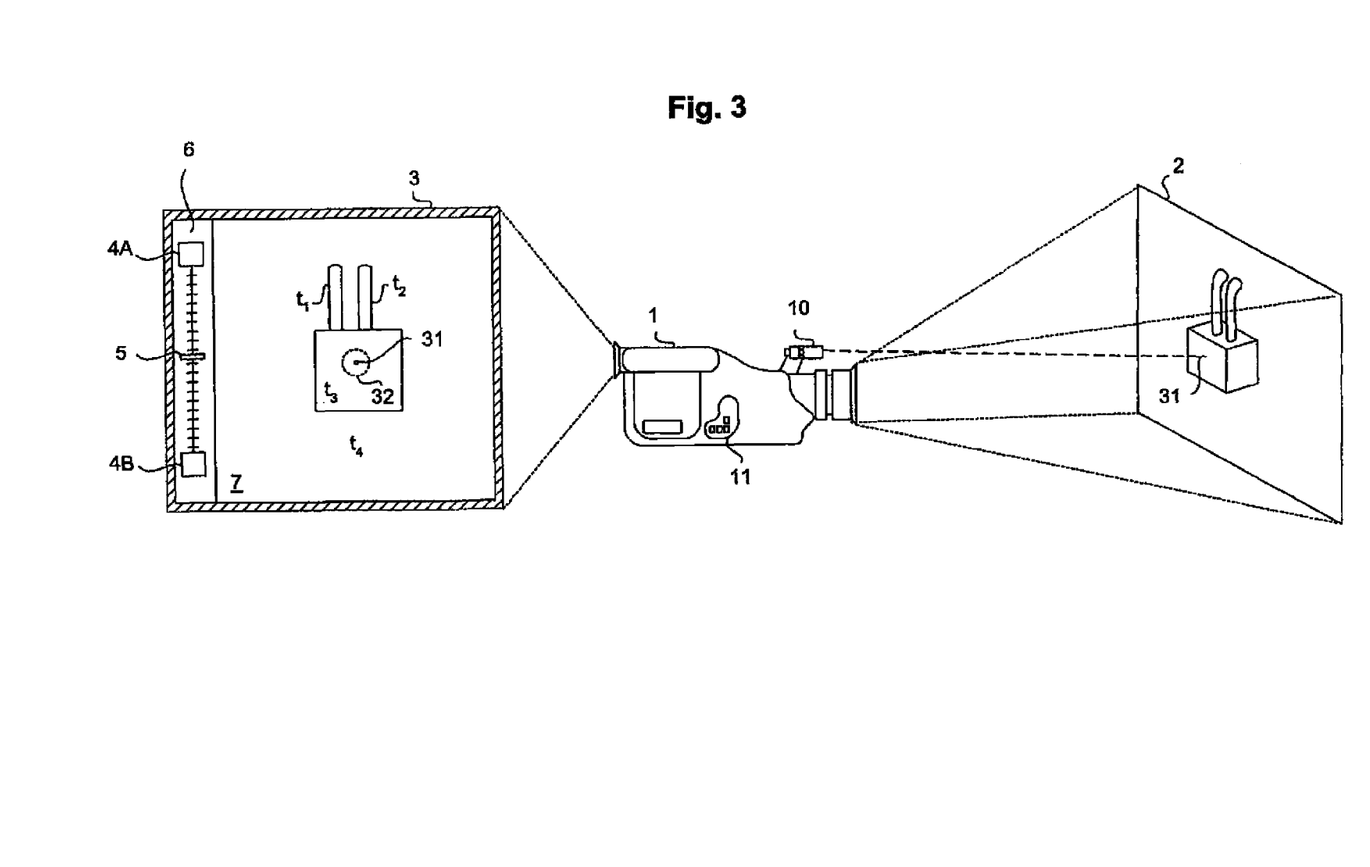
FIG. 3 is another illustration of an exemplary operation of an IR camera according to the invention.

FIG. 3 is another illustration of an exemplary operation of an IR camera 1 according to the invention. This exemplary operation is identical to the exemplary operation shown in FIG. 2, except that in this exemplary operation the temperature reference area 31 in the imaged view 2 is instead indicated by a pointing light source 10. Here, the temperature reference area 31 may also comprise one, several or any number of thermal image pixels.

The user of the IR camera 1 may direct the narrow visible beam of the pointing light source 10 onto a desired object comprised in the imaged view 2. The temperature reference area 31 may be obtained when a manual indication is performed by the user of said IR camera 1. The manual indication may be performed by using, e.g. the inputting means 11. By using the inputting means 11 for the manual indication, the user of the IR camera 1 may indicate to the display control device 24 in the IR camera 1 to automatically set the thermal image colour level 5 according the temperature level of the object that the temperature reference area 31, indicated by narrow visible beam of the pointing light source 10 in the IR camera display 3, is currently directed upon. The additional advantage with this embodiment is that it achieves a clear correlation for the user between the imaged view 2 and the real physical objects/areas captured by said imaged view 2. It also provides the display control device 24 in the IR camera 1 to set the thermal image colour level 5 according to a very narrow or small area, i.e., the temperature reference area 31, as compared to known IR cameras where the thermal image colour level is set, for example, by defining a large max/min box in the IR camera display 3. The expressions "narrow" or "small" should herein be construed as, when defining an area in the thermal image 7, relating to the total size of the thermal image 7.

Although the exemplary embodiments described in relation to FIGS. 2-3 only describes adjusting the thermal image colour level 5, they may also be arranged to adjust the thermal image span 4A, 4B according to the following.

The IR camera 1 according to the exemplary embodiments may also be arranged to automatically adjust the view parameter setting 4A, 4B in the IR camera display 3 in relation to the temperature reference area 8, 31. Preferably, the temperature reference area 8, 31 may here comprise a group of thermal image pixels of the captured thermal image 7, but may also comprise one, several or any number of thermal image pixels. This may, for example, be performed by automatically adjusting the thermal image span 4A, 4B of the thermal image 7 shown in the IR camera display 3 according to the group of thermal image pixels in the imaged view 2 indicated by the centred marker 9 or the pointing light source 10 in the IR camera display 3.

The group of thermal image pixels may be obtained when a manual indication is performed by the user of the IR camera 1. The manual indication may be performed by using, e.g. the inputting means 11 By using the inputting means 11 for the manual indication, the user of the IR camera 1 may indicate to the display control device 24 in the IR camera 1 to automatically set the thermal image colour span 4A, 4B according to the maximum and minimum temperature levels of the object that the group of thermal image pixels is currently directed upon. The group of thermal image pixels may be an arrangement of pixels expanded and centred by the temperature reference area 8, 31, such as, for example, the pixels inside the outer ring of the centred marker 9 in the thermal image 7 in FIG. 2, or inside the predefined area 32 in the thermal image 7 in FIG. 3 surrounding the narrow visible beam of the pointing light source 10.

Figure 4:
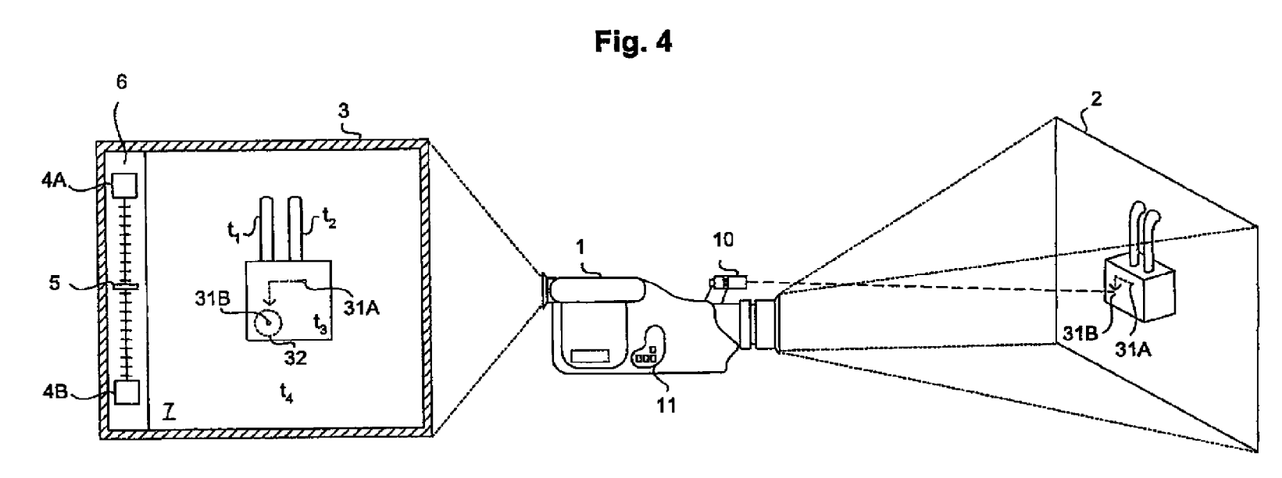
FIG. 4 is a further illustration of an exemplary operation of an IR camera according to the invention.

FIG. 4 is a further illustration of an exemplary operation of an IR camera 1 according to the invention. Although this exemplary operation is described in relation to the embodiment including the pointing light source 10, it is to be understood that it may also be used in the embodiment including the centred marker 9.

The user of the IR camera 1 may direct the narrow visible beam of the pointing light source 10 onto a starting point 31A on a desired object comprised in the imaged view 2. The temperature reference area 31 may be obtained when a manual indication is performed by the user of the IR camera 1. The manual indication may be performed by using, e.g. the inputting means 11. By using the inputting means 11 for the manual indication, the user of the IR camera 1 may indicate to the display control device 24 in the IR camera 1 to automatically set the thermal image colour level 5 and the thermal image colour span 4A, 4B according to the maximum and minimum temperature levels of the total area that is swept across with the temperature reference area 31 over a period of time. That is, the temperatures that are covered by the temperature reference area 31 by moving the temperature reference area 31 from a starting point 31A to an end point 31B. This exemplified by the dashed arrow in FIG. 4. The user of the IR camera 1 may use the inputting means 11 to determine the starting point 31A, the particular period of time and the end point 31B. This may, for example, be performed by the user of the IR camera 1 pushing down and holding a button for the particular period of time or the like, while moving the IR camera 1.

Alternatively, a default thermal image colour span 4A, 4B may be set in a manner as previously described in the earlier embodiments, and then be allowed to be updated according to the embodiment described above in reference to FIG. 4.

An additional advantage with this embodiment is that a user of the IR camera 1 may easily adapt the thermal image colour level 5 and the thermal image colour span 4A, 4B, according to what the user of the IR camera 1 finds interesting in the thermal image 7. Another advantage is that when, for example, sweeping with the IR camera 1 over an area with different temperature content looking for small temperature gradients at different temperature levels, the view parameter settings may be more easily adjusted and the user of the IR camera 1 may be allowed to quicker interpret the thermal image 7.

Figure 5:
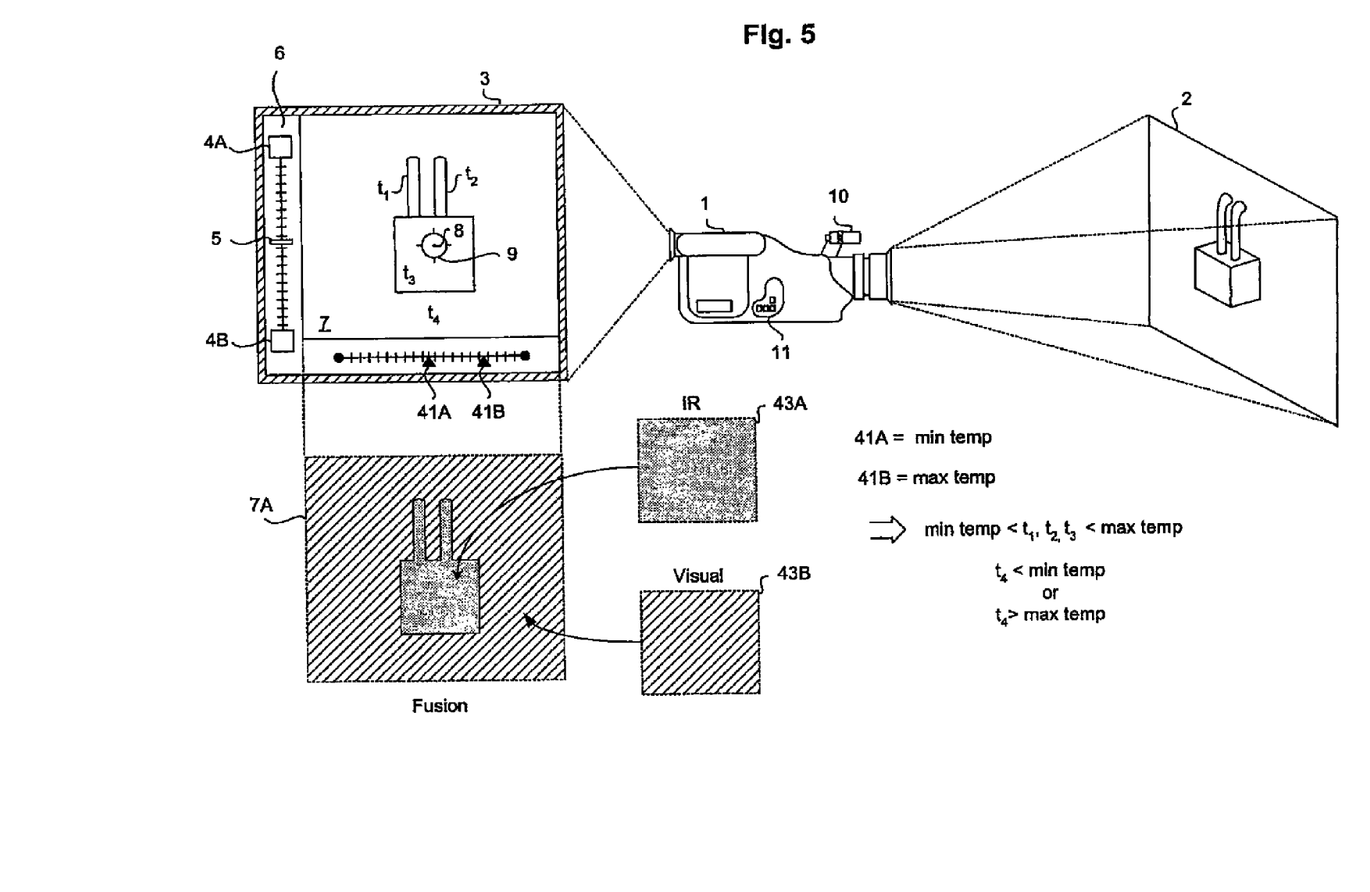
FIG. 5 is another further illustration of an exemplary operation of an IR camera according to the invention.

FIG. 5 is a further illustration of an exemplary operation of an IR camera 1 according to the invention.

In FIG. 5, the IR camera 1 may be directed towards an imaged view 2. The imaged view 2 may comprise objects of which the user of the IR camera 1 wants to capture a fusion image 7A. A fusion image 7A is an image wherein a part of the image is retrieved from IR image data 43A and a part of the image is retrieved from visual image data 43B. The IR camera 1 may use the IR imaging part of the IR camera 1 to capture the IR image data 43A, as described in the previous embodiments, and may use the visual imaging part of the IR camera 1 to capture the visual image data 43B. The display control unit 24 in the IR camera 1 may then merge the IR image data 43A with the visual image data 43B in order to create a fusion image 7A comprising both IR and visible light data.

However, before creating the fusion image 7A as shown in FIG. 5, the display control unit 24 may be arranged to receive view parameter settings 41A, 41B of the IR camera display 3. The view parameter settings may comprise an IR/Visual fusion threshold or level, or an upper IR/Visual fusion threshold 41A and a lower IR/Visual fusion threshold 41B as shown in FIG. 4. The upper IR/Visual fusion threshold 41A may determine above which temperature level the content of the fusion image 7A should be retrieved from the visual image data 43B. The lower IR/Visual fusion threshold 41B may determine below which temperature level the content of the fusion image 7A should be retrieved from the visual image data 43B. Thus, the rest of the content of the fusion image 7A may be retrieved from the IR image data 43A. This may also be applied vice versa (not shown).

This is illustrated in the example shown in FIG. 5, where the upper IR/Visual fusion threshold 41 A and the lower IR/Visual fusion threshold 41 B are set such that parts of the thermal image 7 comprising the temperature levels $t_1, t_2, t_3$ are retrieved from the IR imaging part 43A, and parts of the thermal image 7 comprising the temperature level $t_4$ are retrieved from the visual image data 43B. This may result in a fusion image 7A in which the interesting part of the imaged view 2 is shown as an IR image, while the rest of the fusion image 7A is shown as a visual image, or vice versa (not shown). This, for example, allows the user of the IR camera 1 to more easily understand the context of the thermal image 7 and simplifies interpretation of the same. The IR/Visual fusion threshold(s) 41A, 41B may, for example, be displayed to a user in an area 12 under the thermal image 7 in the IR camera display 3.

It is previously known to perform the adjustments of an IR/Visual fusion threshold(s) of an IR camera display manually by a user of the IR camera. However, as in the previous case, these manual adjustments require knowledge about the function of the IR camera and about how to achieve a good and informative fusion image in the IR camera display. The user of the IR camera also has to reset the IR/Visual fusion threshold(s) when directing the IR camera towards a new imaged view with different temperature content than the imaged view captured when initially setting the IR/Visual fusion threshold(s).

In this exemplary embodiment, and according to the inventive features of the invention, the IR camera 1 is arranged to automatically adjust the IR/Visual fusion threshold(s) 41A, 41B in the IR camera display 3 based on the temperature reference area 8, 31 in the captured thermal image 7. That is, for example, to automatically adjust the IR/Visual fusion threshold(s) 41A, 41B of the thermal image 7A shown in the IR camera display 3 according to a temperature reference area 8, 31 in the imaged view 2 indicated by, for example, a centred marker 9 or a pointing light source 10 in the IR camera display 3.

The user of the IR camera 1 may direct the centred marker 9 in the IR camera display 3 or the pointing light source 10 onto a desired object in the imaged view 2. The temperature reference area 8, 31 may be obtained when a manual indication is performed by the user of the IR camera 1. The manual indication may be performed by using, e.g., the inputting means 11. By using the inputting means 11 for the manual indication, the user of the IR camera 1 may indicate to the display control device 24 in the IR camera 1 to automatically set the IR/Visual fusion threshold(s) 41A, 41B according to the temperature level or the minimum and maximum temperature levels of the object that the temperature reference area 8, 31 is currently directed upon, respectively. For the latter, the temperature reference area 8, 31 preferably comprises a group of thermal image pixels which is an arrangement of pixels expanded by the temperature reference area 8, 31, such as, for example, the pixels inside the outer ring of the centred marker 9 in the thermal image 7 in FIG. 2, or inside the predefined area 32 in the thermal image 7 in FIGS. 3 and 4 surrounding the narrow visible beam of the pointing light source 10.

Additionally, it should also be noted that the embodiment described in reference to FIG. 4, may also be arranged to, in a similar fashion manner as for the thermal image colour span 4A, 4B, determine the IR/Visual fusion threshold(s) 41A, 41B. Preferably, regardless of which of the thermal image colour span 4A, 4B and the IR/Visual fusion threshold(s) 41A, 41B is set, the other of the two is automatically set to equally, that is, if the thermal image colour span 4A, 4B is set to a certain range, then the IR/Visual fusion threshold(s) 41A, 41B will automatically also be set to the same range, and vice versa.

Thus, the IR/Visual fusion threshold(s) 41A, 41B may be arranged to initially correspond to the current thermal image colour span 4A, 4B. This enables both the thermal image colour span 4A, 4B and the IR/Visual fusion threshold(s) 41A, 41B to be set simultaneously. Alternatively, the IR/Visual fusion threshold(s) 41A, 41B may be determined such that the IR/Visual fusion threshold(s) 41A, 41B are set continuously dependent upon the thermal image colour span 4A, 4B. Another alternative is that the IR/Visual fusion threshold(s) 41A, 41B may be set based on a percentage of the thermal image colour span 4A, 4B. Thus, if the percentage for the IR/Visual fusion threshold(s) 41A, 41B is set to 50% of the thermal image colour span 4A, 4B, the IR/Visual fusion threshold(s) 41A, 41B will have a temperature range that is half as large as the thermal image colour span 4A, 4B and be centred around the same thermal image colour level 5 as the thermal image colour span 4A, 4B. For example, if the thermal image colour span 4A, 4B is set to range between 15° C. and 75° C., then the IR/Visual fusion threshold(s) 41A, 41B will automatically relate to this range according to set percentage, in this case 50%, which will lead to the IR/Visual fusion threshold(s) 41A, 41B thus being set between 30° C. and 60° C., and be centred around 45° C.

According to an alternative embodiment, the IR/Visual fusion threshold(s) 41A, 41B in FIG. 5 may be set as relative levels of the total thermal image content instead of, as above, absolute temperature levels dependent on the thermal image colour span 4A, 4B. This is most fittingly described by the following example.

For example, a user of the IR camera 1 may set the IR/Visual fusion threshold(s) 41A, 41B of the image by performing, for example, any of the methods described herein, such that the image view 2 is shown as IR for temperatures between, for example, 23° C. and 30° C. This works well for when the total thermal image content is between, for example, 16° C. and 32° C., and give a good and balanced fusioned image. That is, the temperatures 16°C.-23° C. and 30° C.-32° C. will be visual, while the temperatures 23° C.-30° C. will be IR. However, if the user of the IR camera 1 then directs the IR camera 1 towards another imaged view which gives another total thermal image content between, for example, 34° C. and 50° C., the image will no longer be a fusion image. Instead, the image will be a strictly visual image. The user must then set a new IR/Visual fusion threshold(s) 41A, 41B.

This is solved by allowing a user of the IR camera 1 to set the IR/Visual fusion threshold(s) 41A, 41B as relative levels of the total thermal image content, that is, the IR/Visual fusion threshold(s) may be set as a percentage of all the temperatures comprised in the current total thermal image content. For example, if the percentages are set to 44% and 88% then all temperatures in the image between 44% and 88% may be shown as R. For the exemplary first imaged view described above wherein the total thermal image content is between 16° C. and 32° C., this will produce an image wherein the temperatures 16° C.-23° C. and 30° C.-32° C. will be shown as visual, while the temperatures 23° C.-30° C. will be shown as IR. Now, if the user of the IR camera 1 directs the IR camera 1 towards another imaged view which gives the other total thermal image content between 34° C. and 50° C., these settings will produce an image wherein the temperatures 34° C.-41° C. and 48° C.-50° C. will be shown as visual, while the temperatures 41° C.-48° C. will be shown as IR.

Thus, a user may thus be allowed to in a simple way, for example, select an area in the image view 2 which represents, e.g., 30% of the hottest pixels, to be shown as IR, while the rest is shown as visual. This advantageously reduces the number of actions/steps to be performed by a user of the IR camera 1 in order to achieve a good and balanced fusion image in various situations.

Figure 6:
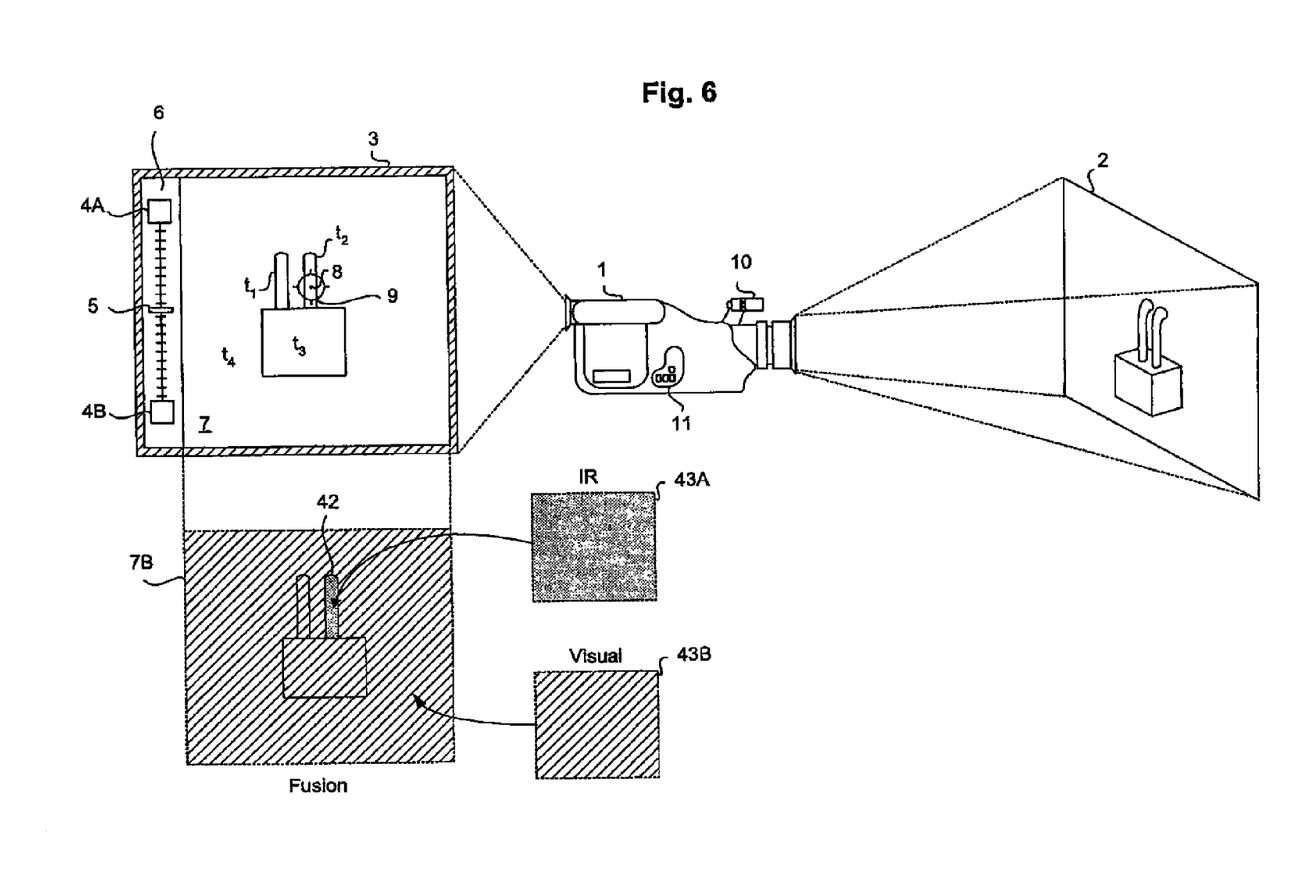
FIG. 6 is another further illustration of an exemplary operation of an IR camera according to the invention.

FIG. 6 is another further illustration of an exemplary operation of an IR camera 1 according to the invention. This exemplary operation is identical to the exemplary operation shown in FIG. 5, except that an object segmentation means in the display control device 24 is used in order to define an object in the imaged view 2. The defined object is then used as a basis for the fusion image 7B.

The object segmentation means in the display control unit 24 may be arranged to segment an image using various known image processing methods. The user of the IR camera 1 may direct the centred marker 9 in the IR camera display 3 or the pointing light source 10 onto a desired object (shown in FIG. 2 as having the temperature t₂) in the imaged view 2. By using, e.g. the inputting means 11, the user of the IR camera 1 may indicate to the display control device 24 in the IR camera 1 to perform object segmentation using the object segmentation means. The object segmentation means may then identify a segment 42 representing the desired object in the imaged view 2, which then is indicated by, for example, the centred marker 9 in the IR camera display 3, the temperature reference area 8 or the pointing light source 10. The identified segment 42 may thus be associated with the desired object in the imaged view 2. It should be noted that although the object indicated by, e.g. the centred marker 9, is identified as the segment 42 in a 1:1 ratio, the identified segment 42 may also be arranged to be slightly larger or smaller than the exact area of the indicated object. That is, the segment 42 may comprise a bigger or smaller area as compared to the area of the indicated object.

The display control unit 24 may further be arranged to use the identified segment 42 from the object segmentation means in order compile the fusion image 7B shown by the IR camera display 3. This may be performed such that the part of the image 7B associated with the identified segment 42 is retrieved from the IR image data 43A, and the remaining parts of the image is retrieved from the visual image data 43B. This may also be applied vice versa.

Preferably, the object segmentation means in the display control unit 24 may be arranged to perform said object segmentation by using visual image data. By replacing an area with a homogeneous appearance in a visual image with information from the IR image data, no significant information will be removed, that is, the visual image may still easily be interpreted. This may also provide a more natural correspondence to what a user of an IR camera 1 perceives as a coherent object in a visual image, than if the object segmentation where to be performed on the IR image data 43A. However, there might be situations where the object segmentation preferably may be performed on the IR image data 43A.

Preferably, by limiting the object segmentation so as to, from the temperature reference area 8, 31, find a coherent segment 42, i.e., the identified object, simple image processing methods may be used for performing the object segmentation. An example of such a simple image processing method is where the temperature reference area 8, 31 in the visual image data 43B is allowed to expand until the spatial derivative of the visual image data reaches a threshold value. The threshold value may then define the edge of the identified object 42 in thermal image 7. The threshold value may, for example, be predetermined default value or be arranged to be set by the user of the IR camera 1. The latter may also be used iteratively, for example, allowing a user of the IR camera 1 to select a threshold parameter, such as, "Find bigger objects" or "Find smaller objects", whereby the threshold value may be decreased or increased, respectively. This may, for example, be performed by using the inputting means 11 in the IR camera 1.

Alternatively, the exemplary operation described in reference to FIG. 4 may also be used by the object segmentation means in the display control unit 24. For example, the user of the IR camera 1 may be allowed to sweep across an area of the imaged view 2 that the user of the IR camera wants to see in infrared (IR), or visual. Instead of determining a thermal image colour span 4A, 4B as in the exemplary operation described in reference to FIG. 4, the total area that is swept across with the temperature reference area 8, 31 may determine a geographical area in the imaged view 2. This enables, for example, the display control unit 24 to start by showing a visual image of the image view 2 in the IR camera display 3, and then use the object segmentation means to allow the user of the IR camera 1 to gradually indicate an area in the imaged view 2 which is to be displayed as IR in the IR camera display 3. Known methods for image stabilization and image improvement may here be used to determine the motion in the fusion image 7B, that is, the movement of the IR camera 1. Thus, this alternative enables the IR camera 1 to use the IR camera movement and the area indicated by the user of the IR camera 1 in order to create an area in the fusion image 7B which separate IR image data and visual image data.

Figure 7:
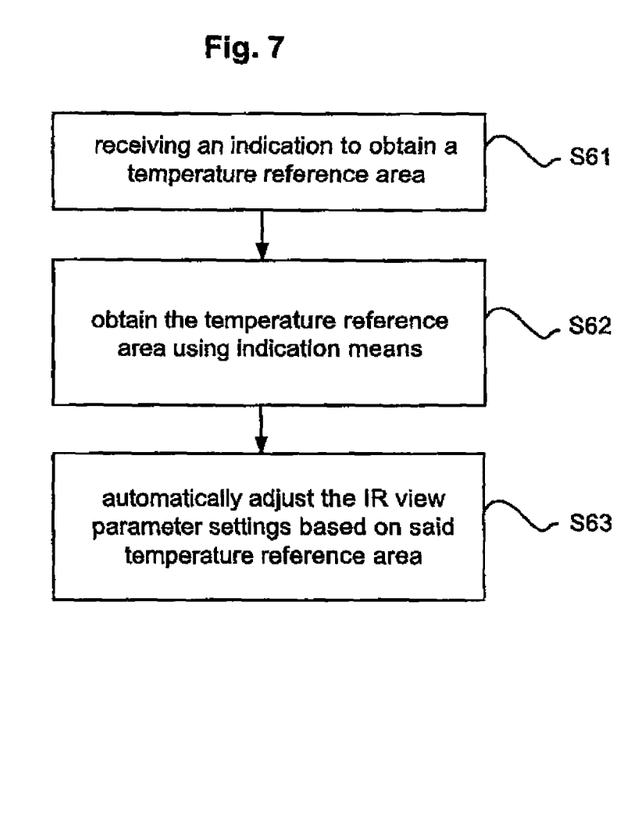
FIG. 7 is a flowchart illustrating a method according to an exemplary embodiment of the invention.

FIG. 7 is a flowchart illustrating a method according to an exemplary embodiment of the invention.

In step S61, the display control unit 24 in the IR camera 1 may receive an indication to obtain a temperature reference area 8, 31 in the thermal image 7. This may be performed manually by a user of the IR camera 1 by using the inputting means 11. This may also be performed by the user of the IR camera 1 in order to set any of the view parameter settings 4A, 4B, 5, 41A, 41B, that is, the thermal image colour level 5, the thermal image colour span 4A, 4B, and the IR/Visual fusion threshold 41A, 41B.

In step S62, the display control unit 24 in the IR camera 1 may obtain a temperature reference area 8, 31 in the thermal image 7 using an indication means 9, 10. The indication means 9, 10 may, for example, be a centred marker 9 in the IR camera display 3, or a pointing light source 10.

In step S63, the display control unit 24 in the IR camera 1 may automatically adjust the indicated view parameter setting 4A, 4B, 5, 41A, 41B, based on the temperature reference area 8, 31 in the thermal image 7 obtained in step S62.

Figure 8:
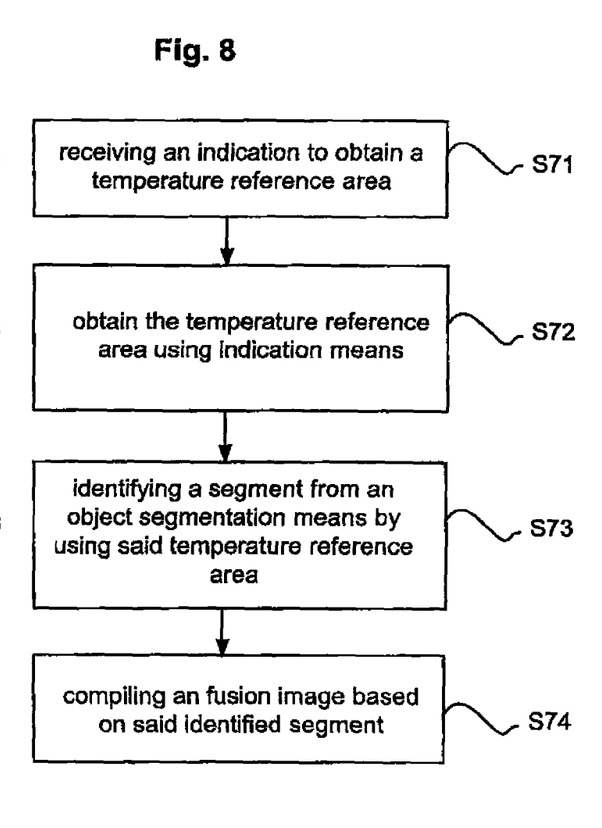
FIG. 8 is a flowchart illustrating a method according to an exemplary embodiment of the invention.

FIG. 8 is a flowchart illustrating a method according to an exemplary embodiment of the invention.

Step S71 is identical with step S61 in the previously described method, except that step S71 is performed in order to indicate to the object segmentation means in the display control device 24 in the IR camera 1 to perform segmentation and identify a segment 42 in the thermal image 7. Step S72 is identical with step S62 in the previously described method.

In step S73, the object segmentation means in the display control device 24 in the IR camera 1 may perform segmentation of a captured image, and identify a segment 42 by using the temperature reference area 8, 31 obtained in step S72.

In step S74, the display control device 24 in the IR camera 1 may compile a fusion image 7B based on the identified segment. The fusion image 7B may be compiled such that the part of the image 7B associated with the identified segment 42 is retrieved from IR image data 43A, and the remaining parts of the image is to be retrieved from the visual image data 43B.

The description above is of the best mode presently contemplated for practising the invention. The description is not intended to be taken in a limiting sense, but is made merely for the purpose of describing the general principles of the invention. The scope of the invention should be ascertained with reference to the issued claims.

What is claimed is:

1. An infrared (IR) camera for capturing thermal images of an imaged view, the IR camera comprising:
   An IR camera display arranged to display said captured thermal images to a user of said IR camera according to a view parameter setting; and
   A display control unit arranged to automatically adjust the view parameter setting in the IR camera display in response to obtaining thermal information associated with a temperature reference area, wherein the thermal information is obtained in response to the user indicating an area, of the thermal image being displayed, as the temperature reference area using an indication means.

2. The IR camera according to claim 1, wherein said temperature reference area comprises one, several, or any number of thermal image pixels less than a number of pixels in the thermal image, wherein said view parameter setting is related to the thermal information associated with said captured thermal image, and wherein said view parameter setting comprises a thermal image colour level and/or a thermal image colour span.

3. The IR camera according to claim 1, wherein said view parameter setting comprises a thermal image colour level and/or a thermal image colour span, and wherein the thermal image colour span determines a temperature range to be displayed in non-neutral colours and the thermal image colour level determines a center temperature for the temperature range.

4. The IR camera according to claim 3, wherein said thermal image colour level is adjusted in response to obtaining a temperature level of the area of the captured thermal image indicated as said temperature reference area.

5. The IR camera according to claim 3, wherein said thermal image colour level is adjusted in response to obtaining temperature levels of the area of the captured thermal image indicated as said temperature reference area.

6. The IR camera according to claim 3 2, wherein said thermal image colour span is adjusted in response to obtaining temperature levels of a total area that is swept across with said temperature reference area in said captured thermal image over a period of time.

7. The IR camera according to claim 1, wherein said indication means is a marker or a spot indicator; and
   The indicating the area of the thermal image is performed by the user aiming said marker or spot indicator, on the IR camera display towards a specific spot in the imaged view and using an inputting means, whereby said IR camera id arranged to interpret said specific spot as said temperature reference area in said captured thermal image.

8. The IR camera according to claim 1, wherein said indication means is a light source means comprised in said IR camera, said light source means emitting at least one narrow beam within the visible wavelength region towards a specific spot on the imaged view; and
   The indicating the area of the thermal image is performed by using said light source means and an inputting means, whereby said IR camera is arranged to interpret said specific spot as said temperature reference area in said captured thermal image.

9. The IR camera according to claim 1, further comprising:
   an IR imaging part for capturing IR image data of said imaged view, said IR imaging part comprising IR optics;
   a visual imaging part for capturing visible light data of said imaged view, said visual imaging part comprising visible light optics; and
   wherein said view parameter setting comprises an IR/Visual fusion threshold, which determines what part of the image shown by said IR camera display is retrieved from the IR image data and what part of the image is retrieved from the visual image data.

10. The IR camera according to claim 9, wherein said IR/Visual fusion threshold is such that parts of the image shown by said IR camera display having temperature levels above/below said temperature level of said temperature reference area in said captured thermal image is retrieved from the visual image data, and the remaining parts of the image is retrieved from the IR image data.

11. The IR camera according to claim 9, wherein said IR/Visual fusion threshold is a threshold span which is adjusted in response to obtaining temperature levels of the area of the captured thermal image indicated as said temperature reference area, such that parts of the image shown by said IR camera display having temperature levels above a maximum temperature level and below a minimum temperature level of said temperature reference area is retrieved from the visual image data, and the remaining parts of the image is retrieved from the IR image data, or vice versa.

12. The IR camera according to claim 9, wherein said IR/Visual fusion threshold is a threshold span which is adjusted in response to obtaining temperature levels of a total area that is swept across with said temperature reference area in said captured thermal image over a period of time, such that parts of the image shown by said IR camera display having temperature levels above a maximum temperature level and below a minimum temperature level of said total area is retrieved from the visual image data, and the remaining parts of the image is retrieved from the IR image data, or vice versa.

13. The IR camera according to claim 1, further comprising:
   object segmentation means arranged to segment an imaged view such that the resulting segments can be associated with objects in said imaged view;
   whereby said IR camera is further arranged to:
      identify a segment from said object segmentation means by using said temperature reference area; and
      compile the image shown by said IR camera display such that the part of the image associated with the identified segment is retrieved from the IR image data, and the remaining parts of the image is retrieved from the visual image data, or vice versa.

14. The IR camera according to claim 13, wherein said object segmentation means may perform said object segmentation by using visual image data.

15. A method for adjusting view parameter settings in an infrared (IR) camera, said IR camera comprising an IR camera display arranged to display captured thermal images to a user of said IR camera according to said view parameter settings, the method comprising:

Receiving a manual indication from said user of said IR camera to indicate an area, of the captured thermal images being displayed, as a temperature reference area;

Obtaining thermal information associated with said temperature reference area; and Automatically adjusting said view parameter settings in the IR camera display in response to the obtained thermal information.

16. The method according to claim 15, wherein:
the obtained thermal information comprises a temperature level of said temperature reference area;
the automatically adjusting said view parameter settings comprises adjusting a thermal image colour level in response to the obtained temperature level; and
the thermal image colour level determines a center temperature for a temperature range to be displayed in non-neutral colours.

17. The method according to claim 15, wherein:
the obtained thermal information comprises temperature levels of said temperature reference area;
the automatically adjusting said view parameter settings comprises adjusting a thermal image colour span in response to the obtained temperature levels; and
the thermal image colour span sets a temperature range to be displayed in non-neutral colours.

18. The method according to claim 15, further comprising:
obtaining temperature levels of a total area that is swept across with said temperature reference area in said captured thermal image over a period of time;
adjusting a thermal image colour span in response to the obtained temperature levels of the total area; and
wherein the thermal image colour span sets a temperature range to be displayed in non-neutral colours.

19. The method according to claim 15, wherein:
the obtained thermal information comprises temperature levels of said temperature reference area; and
the automatically adjusting said view parameter settings comprises adjusting an IR/Visual fusion threshold such that parts of the image shown by a IR camera display having temperature levels above/below said temperature level of said temperature reference area in said captured thermal image is retrieved from visual image data, and the remaining parts of the image is retrieved from IR image data.

20. The method according to claim 15, wherein:
the obtained thermal information comprises temperature levels of said temperature reference area; and
the automatically adjusting said view parameter settings comprises adjusting an IR/Visual fusion threshold in response to the obtained temperature levels of said temperature reference area in said captured thermal image, such that parts of the image shown by a IR camera display having temperature levels above a maximum temperature level and below a minimum temperature level of said temperature reference area is retrieved from the visual image data, and the remaining parts of the image is retrieved from the IR image data, or vice versa.

21. The method according to claim 15, further comprising:
obtaining temperature levels of a total area that is swept across with said temperature reference area in said captured thermal image over a period of time; and
adjusting an IR/Visual fusion threshold in response to the obtained temperature levels of the total area, such that parts of the image shown by a IR camera display having temperature levels above a maximum temperature level and below a minimum temperature level of said total area is retrieved from the visual image data, and the remaining parts of the image is retrieved from the IR image data, or vice versa.

22. The method according to claim 15, further comprising:
identifying a segment from said object segmentation means by using said temperature reference area in said captured thermal image; and
compiling the image shown by said IR camera display such that the part of the image associated with the identified segment is retrieved from the IR image data, and the remaining parts of the image is retrieved from the visual image data, or vice versa.

23. A computer program product comprising non-transitory computer readable code for adjusting view parameter settings of an infrared (IR) camera display for viewing images captured by an IR camera, a display control unit included in the IR camera operable to execute the computer readable code, the computer program product comprising computer readable code for:

Receiving a manual indication from a user of said IR camera to indicate an area, of the capture thermal images being displayed, as a temperature reference area;

Obtaining thermal information associated with said temperature reference area; and Automatically adjusting said view parameter settings in said IR camera display in response to the obtained thermal information.

24. The computer program product according to claim 23, wherein:
the obtained thermal information comprises a temperature level of said temperature reference area;
the automatically adjusting said view parameter settings comprises adjusting a thermal image colour level in response to the obtained temperature level; and
the thermal image colour level sets a center temperature for a temperature range to be displayed in non-neutral colours.

25. The computer program product according to claim 23, wherein:
the obtained thermal information comprises temperature levels of said temperature reference area;
the automatically adjusting said view parameter settings comprises adjusting a thermal image colour span in response to the obtained temperature levels; and
the thermal image colour span sets a temperature range to be displayed in non-neutral colours.

26. The computer program product according to claim 23, further comprising computer readable code for:
obtaining temperature levels of a total area that is swept across with said temperature reference area in said captured thermal image over a period of time;
adjusting a thermal image colour span in response to the obtained temperature levels of the total area; and
wherein the thermal image colour span sets a temperature range to be displayed in non-neutral colours.

27. The computer program product according to claim 23, wherein:
- the obtained thermal information comprises temperature levels of said temperature reference area; and
- the automatically adjusting said view parameter settings comprises adjusting an IR/Visual fusion threshold such that parts of the image shown by a IR camera display having temperature levels above/below said temperature level of said temperature reference area in said captured thermal image is retrieved from visual image data, and the remaining parts of the image is retrieved from IR image data.

28. The computer program product according to claim 23, wherein:
- the obtained thermal information comprises temperature levels of said temperature reference area; and
- the automatically adjusting said view parameter settings comprises adjusting an IR/Visual fusion threshold in response to the obtained temperature levels of said temperature reference area in said captured thermal image, such that parts of the image shown by a IR camera display having temperature levels above a maximum temperature level and below a minimum temperature level of said temperature reference area is retrieved from the visual image data, and the remaining parts of the image is retrieved from the IR image data, or vice versa.

29. The computer program product according to claim 23, further comprising computer readable code for:
- obtaining temperature levels of a total area that is swept across with said temperature reference area in said captured thermal image over a period of time; and
- adjusting an IR/Visual fusion threshold in response to the obtained temperature levels of the total area, such that parts of the image shown by a IR camera display having temperature levels above a maximum temperature level and below a minimum temperature level of said total area is retrieved from the visual image data, and the remaining parts of the image is retrieved from the IR image data, or vice versa.

30. The computer program product according to claim 23, further comprising computer readable code for:
- identifying a segment from said object segmentation means by using said temperature reference area in said captured thermal image; and
- compiling the image shown by said IR camera display such that the part of the image associated with the identified segment is retrieved from the IR image data, and the remaining parts of the image is retrieved from the visual image data, or vice versa.

31. The computer program product according to claim 23, wherein said computer readable code is stored on a readable storage medium.

* * * * *